US 9,464,626 B2

(12) United States Patent
Tolo (10) Patent No.: US 9,464,626 B2
(45) Date of Patent: Oct. 11, 2016

(54) FLOATING WIND TURBINE
(71) Applicant: WINDEL AS, Randaberg (NO)
(72) Inventor: Magne Tolo, Randaberg (NO)
(73) Assignee: Windel AS, Randaberg (NO)
( * ) Notice: Subject to any disclaimer, the term of this patent is extended or adjusted under 35 U.S.C. 154(b) by 369 days.

(21) Appl. No.: 14/347,292
(22) PCT Filed: Sep. 25, 2012
(86) PCT No.: PCT/NO2012/050183
§ 371 (c)(1),
(2) Date: Mar. 26, 2014
(87) PCT Pub. No.: WO2013/048257
PCT Pub. Date: Apr. 4, 2013

(65) Prior Publication Data
US 2014/0234105 A1    Aug. 21, 2014

(30) Foreign Application Priority Data
Sep. 29, 2011 (NO) .................................. 20111329

(51) Int. Cl.
*F03D 11/04* (2006.01)
*E04H 12/18* (2006.01)
(Continued)

(52) U.S. Cl.
CPC .............. *F03D 11/04* (2013.01); *E04H 12/187* (2013.01); *E04H 12/345* (2013.01); *F03D 1/001* (2013.01); *F03D 1/005* (2013.01); *F03D 13/20* (2016.05); *F05B 2230/60* (2013.01); *F05B 2240/9152* (2013.01); *F05B 2240/93* (2013.01); *F05B 2240/95* (2013.01); *F05B 2250/11* (2013.01);
(Continued)

(58) Field of Classification Search
CPC ........ F03D 11/04; F03D 1/001; F03D 1/005; F03D 13/20; F03D 9/00; F05B 2230/60; E04H 12/187; E04H 12/345
USPC .......................................................... 416/85
See application file for complete search history.

(56) References Cited

U.S. PATENT DOCUMENTS

| 5,807,029 A | 9/1998 | Ellnor |
| 8,192,160 B2* | 6/2012 | Lopez et al. ............ F03D 13/20 |
| | | 416/1 |
| 2011/0179986 A1 | 7/2011 | Nielson |

(Continued)

FOREIGN PATENT DOCUMENTS

| DE | 20100588 U1 | 3/2001 |
| GB | 2407114 A | 4/2005 |

(Continued)

*Primary Examiner* — Kevin Lee
(74) *Attorney, Agent, or Firm* — Gable Gotwals (57) ABSTRACT A floating wind turbine (1) for electric power production and a method for use of the wind turbine (1) is described. The wind turbine (1) includes a hull (2) attached to a supporting column (2') for a wind turbine (3) arranged to be put into rotation by wind force acting on rotor blades (3'). The wind turbine (1) is connected to a buoyancy device (4) by a coupling device (5). The buoyancy device (4) encircles at least a portion of the hull (2) and supports at least a portion of the mass of the wind turbine (1). The coupling device (5) is a rotary coupling arranged in such a way that the wind turbine (1) is able to rotate an angle from an essentially vertical position towards a horizontal position, or the opposite. The hull (2) is provided with an adjustable ballast (9, 12) arranged to balance the wind turbine (1) about the rotary coupling (5) in any position between the positions.

12 Claims, 6 Drawing Sheets (51) Int. Cl.
*E04H 12/34* (2006.01)
*F03D 1/00* (2006.01)

(52) U.S. Cl.
CPC ............. *Y02E 10/727* (2013.01); *Y02E 10/728* (2013.01); *Y10T 29/49316* (2015.01)

(56) References Cited

U.S. PATENT DOCUMENTS

2014/0103664 A1* 4/2014 Abiassi .................. F03D 1/001
290/55

2016/0061192 A1* 3/2016 Guyot ..................... F03D 11/04
416/85

FOREIGN PATENT DOCUMENTS

| | | |
|---|---|---|
| GB | 2462602 A | 2/2010 |
| JP | 63124875 | 5/1988 |
| NO | 330281 B1 | 3/2011 |
| WO | WO02052150 A1 | 7/2002 |
| WO | WO2010021655 A2 | 2/2010 |
| WO | WO2010138622 A2 | 12/2010 |
| WO | WO2011051804 A1 | 5/2011 |

* cited by examiner

FLOATING WIND TURBINE

CROSS-REFERENCE TO RELATED APPLICATION

This United States National Phase of PCT Application No. PCT/NO2012/050183 filed 25 Sep. 2012, claims priority to Norwegian Patent Application No. 20111329 filed 29 Sep. 2011, each of which are incorporated herein by reference.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

BACKGROUND OF THE INVENTION

The present invention relates to a floating wind turbine and a method for controlling the vertical extent of the wind turbine. More particularly it relates to a floating windmill for electric power production, the windmill comprises a hull attached to a supporting column for a wind turbine which is arranged to be put into rotation by wind force acting on rotor blades, the wind turbine is connected to a buoyancy device by means of a coupling device, the buoyancy device is arranged encircling at least a portion of the hull, and the buoyancy device is arranged to be able to support at least a portion of the mass of the wind turbine.

The purpose of the present invention is to provide an apparatus and a method which will enable simplifying transport and erecting of a floating wind turbine at sea by heeling the wind turbine relative to the buoyancy device which is floating at the sea surface, and thereby the wind turbine may be laid down and erected in a controlled way, preferably without external lifting devices, for the purpose of reducing the draft of the hull and the height of the supporting column.

In the light of the continuously increasing demand for environmentally friendly and renewable energy, it is desirable to harvest the resources from wind energy, particularly at open sea where occurrences and available areas are particularly large and installations for energy production moreover are of relatively little nuisance and without encroachments on nature. The need and the market for wind turbines for electric power production at sea have therefore increased, and various solutions for fixed and floating installations have been launched.

Prior art for installation of wind turbines at sea can principally be divided into two categories; installations fixed to the sea floor and floating installations, suited for shallow and deep areas of the ocean, respectively.

Various forms of foundations fixed to the sea floor have been launched, where some are already well established on the market, while others are on a conceptual level.

Most widespread so far are steel jackets fixed to the sea floor by means of piles. This solution is well suited for minor depths of the ocean. This solution and similar solutions have in common that installation of supporting column and wind turbine, and also later maintenance and repair, must take place at open sea by means of large and costly crane vessels, where weather and wave conditions may be a complicating and limiting factor.

Other kinds of constructions fixed to the sea floor are based on solutions with a steel or concrete foundation having buoyancy and stability, and the installations may thereby be completed at shore before they are towed floating to the field and put down on the sea floor for mainly permanent installation. Future maintenance and repair must therefore be carried out in situ.

Still others have a floating hull with support legs which can be lowered down and placed on the sea floor in such a way that the hull can be raised above the sea surface. This solution is intended for a non-permanent installation, and enables relatively simple reversing and return to shore for maintenance and repair.

Prior art for floating installations mainly comprises isolated supporting columns floating upright in the sea, and stable hulls with one or more supporting columns.

Embodiments with floating columns may be assembled in calm waters, but due to the draft of the construction in order to achieve satisfactory stability, relatively large water depths are required both for the assembly and the transport route to the anchoring field, and the embodiment is therefore unsuitable for assembling and later maintenance at shore.

Known embodiments of floating hulls with one or more supporting columns for wind turbines mounted thereon have the advantage of being able to be both completed and later maintained and repaired at shore, but are comparatively more expensive to build due to the required mass and size of the hull in order to achieve satisfactory stability.

The publication NO 330281 B1 discloses a floating wind turbine, including a rotor, an upper column attached to the rotor, and a stabilizer tank arranged between the upper column and a lower column, where the stabilizer tank has its center of buoyancy eccentrically arranged relative to a longitudinal center axis to the upper and lower column.

Further floating wind turbines are known from publication WO 2011051804 A1, U.S. 2011179986 A1 and DE 20100588 U1.

The present invention has for its object to remedy or reduce at least one of the drawbacks of the prior art, or at least provide a useful alternative to prior art.

The object is achieved through features specified in the description below and in the appended claims.

BRIEF SUMMARY OF THE INVENTION

In a first aspect the invention relates to a floating wind turbine for electric power production, the wind turbine comprises a hull attached to a supporting column for a wind turbine arranged to be put into rotation by wind force acting on rotor blades, the wind turbine is connected with a buoyancy device by means of a coupling device, the buoyancy device is arranged encircling at least a portion of the hull, the buoyancy device is arranged to be able to support at least a portion of the mass of the wind turbine, wherein the coupling device is a rotary coupling arranged in such a way that the wind turbine is arranged to be able to rotate an angle from an essentially vertical position towards a horizontal position, or the opposite, and the hull is provided with an adjustable ballast means arranged to be able to balance the wind turbine about the rotary coupling in any position between said positions. Thus the wind turbine may be rotated relative to the buoyancy device.

This has the effect that when the wind turbine is rotated or is made to heel from a vertical position towards a horizontal position, the draft of the hull of the wind turbine will be reduced, at the same time as the height of the supporting columns will be reduced. Thus a wind turbine which is connected to the buoyancy device may be transported through relatively shallow waters and underneath e.g. bridge constructions.

A wind turbine balanced in a desired position by means of the adjustable ballast means, will due to the rotary coupling in all essentials transfer a vertical force against the buoyancy device. Thus the wind turbine and the buoyancy device will to a great extent be able to move independently of each other e.g. when towing in waves acting in or against the direction of motion which normally will be parallel with the horizontal component of the longitudinal axis.

In one embodiment the rotation is carried out by the wind turbine solely by means of the adjustable ballast means. The rotation can be both from a vertical position towards a horizontal position and from a non-vertical position to a vertical position.

In one embodiment the ballast means comprises one or more weights which are movably arranged essentially along a longitudinal axis of the wind turbine. The weight may be arranged coaxially with the longitudinal axis of the wind turbine. The weight may be moved in a per se known way by means of a drive means, e.g. a drive means of the kind which is explained in the following when discussing FIG. 4.

In one embodiment the ballast means comprises at least one fluid which is brought into or out of at least one chamber arranged in the hull. One of the at least one fluid comprises a liquid. Another of the at least one fluid may comprise a gas, e.g. air, which is pumped into the at least one chamber to adjust the ratio between liquid and gas in the chamber. A person skilled in the art will understand that in such an embodiment there must be provided a means to provide fluid communication between the chamber and a liquid reservoir. The liquid reservoir may be the sea the wind turbine is floating in, or another chamber. Thus the at least one chamber may comprise at least two chambers, wherein the amount of liquid in each of the chambers is adjustably arranged. The adjustment may be provided by means of one or more pumping devices of a per se known kind.

In one embodiment the buoyancy device comprises at least three spaced apart buoyancy bodies securely connected to a frame construction, where the frame construction supports the coupling device.

In an alternative embodiment the buoyancy device comprises one body. The body may for example, but not limited to, be U- or V-shaped. The coupling device may be connected directly to the buoyancy body, or the coupling device may be connected to the buoyancy body by means of a frame construction.

In still another alternative embodiment, the buoyancy device comprises two spaced apart elongated buoyancy elements, but which are interconnected by means of a frame construction. The coupling device may be supported from the frame construction or from the buoyancy elements.

The wind turbine may be provided with a locking means which is arranged to be able to secure or fix the wind turbine at least in an essential vertical position relative to the direction of buoyancy. Thus the buoyancy device contributes to the stability of the wind turbine.

In a second aspect of the present invention a method for controlling a vertical extent of a floating wind turbine for production of electric power is provided, in connection with transport and maintenance, the wind turbine is of the kind comprising a hull attached to a supporting column for a wind turbine which is arranged to be put into rotation by wind force acting on rotor blades, the wind turbine is connected with a buoyancy device arranged at least partially encircling at least a portion of the hull, and which is arranged to be able to support at least a portion of the mass of the wind turbine, the method comprises:

interconnecting the wind turbine with the buoyancy device by means of a rotary coupling in such a way that the wind turbine can be rotated an angle from an essentially vertical position to a horizontal position, or the opposite;

performing a rotary movement of the wind turbine about the rotary coupling;

balancing the wind turbine about the rotary coupling in any position between said positions by adjusting a ballast means arranged in the hull of the wind turbine.

The rotary movement may be provided by controlling the adjustable ballast device.

In an alternative method at least an initial rotary movement is provided by means of an applied force. Such an alternative method is particularly relevant during an initial rotation from an essentially vertical position towards a non-vertical position.

The above embodiment differs from generally known embodiments with floating columns for wind turbines e.g. of the kind which is known from Hywind and Sway, in that it has a surrounding floating frame which in a normal position is securely connected with the hull and thereby contributes with buoyancy and stability to the hull in such a way that the inherent buoyancy and stability of the hull may be reduced accordingly. Hywind is a floating ocean wind turbine where the construction comprises a steel cylinder filled with a ballast of water and stones. It extends approximately 100 meter down into the sea and is moored to the sea floor. Sway is a floating construction which is anchored to the sea floor by tension legs.

Further the above embodiment differs from generally known embodiments in that the longitudinal axis of the wind turbine in a transport position can be closer to a horizontal position than a vertical position. The vertical extent of the wind turbine during transport can therefore be very much less than the vertical extent of the wind turbine in a normal or production position where the longitudinal axis of the wind turbine is essentially vertical, at the same time as the wind turbine with the buoyancy device is self-supported and stable and may be transported floating without any supporting vessel, but yet much lighter and smaller than known embodiments with stable, floating hull with fixed support column(s).

Finally, the above embodiment differs from generally known embodiments in that the supporting column may be erected and laid down in a controlled way by moving the center of gravity of the hull and changing the hull's mass, essentially without using external lifting devices.

BRIEF DESCRIPTION OF THE DRAWINGS

In what follows, an example of a preferred embodiment is described, which is visualized in the accompanying drawings, in which.

In the figures, similar or corresponding elements are denoted with the same reference numerals.

DETAILED DESCRIPTION OF THE
PREFERRED EMBODIMENT

Position and situation designations, like e.g. right, left, upper, lower, vertical, horizontal, refers to the position illustrated in the figures.

In the figures reference numeral 1 denotes a wind turbine for electric power production. The wind turbine 1 comprises a hull 2 attached to a supporting column 2'. In the upper portion of the supporting column 2' there is arranged a wind turbine 3, which in a per se known way is arranged to be put into rotation by wind acting on three rotor blades 3'.

The wind turbine 1 is connected to a buoyancy device 4 which is arranged to be able to support a least a portion of the mass of the wind turbine 1, in addition to the mass of the buoyancy device 4 and also the mass of mooring devices 7 forming a part of a mooring system which will be well known to a person skilled in the art, and for that reason will not be described more closely in this document.

The buoyancy device 4 includes in the illustrated embodiment three buoyancy bodies 4' formed by pontoons. Each of the three buoyancy bodies 4' is interconnected with another buoyancy body 4' by means of a frame construction 4". The buoyancy bodies 4' are in the illustrated embodiment interconnected in a V-shape which is best illustrated in FIGS. 1c and 2b.

The wind turbine 1 is connected to the buoyancy device 4 by means of a coupling device 5 formed by a rotary coupling. The rotary coupling 5 comprises in the illustrated embodiment two fork elements 5' which are fixed mounted to the frame construction 4" on opposite sides of the hull 2 of the wind turbine 1. The fork elements 5' are complementary adapted to two pivots 5" protruding from the hull 2. Thus the coupling device 5 is a rotary coupling or a tilting anchorage which provides a rotary or tilting axis W which in all essentials transfers vertical forces from the wind turbine 1 to the buoyancy device 4, no matter the position or incline of the longitudinal axis L of the wind turbine 1 relative to the buoyancy device 4.

The portion of the hull 2 of the wind turbine 1 which is immersed will support a part of the total mass of the wind turbine 1.

Figure 1A:
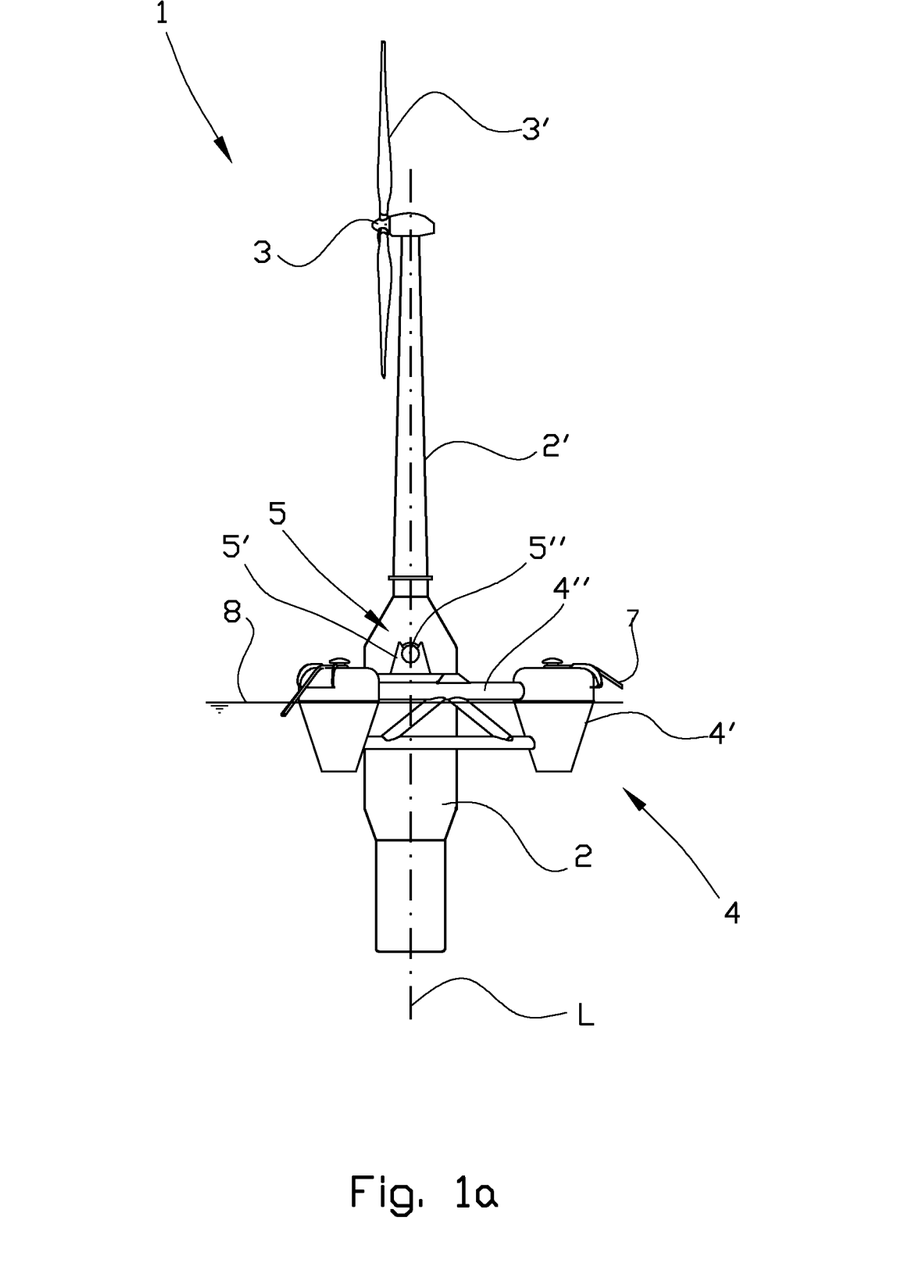
FIG. 1a illustrates an elevational view of a wind turbine seen from one side, where the wind turbine is supported in an upright position at a water surface by means of a floating base structure.
Figure 1B:
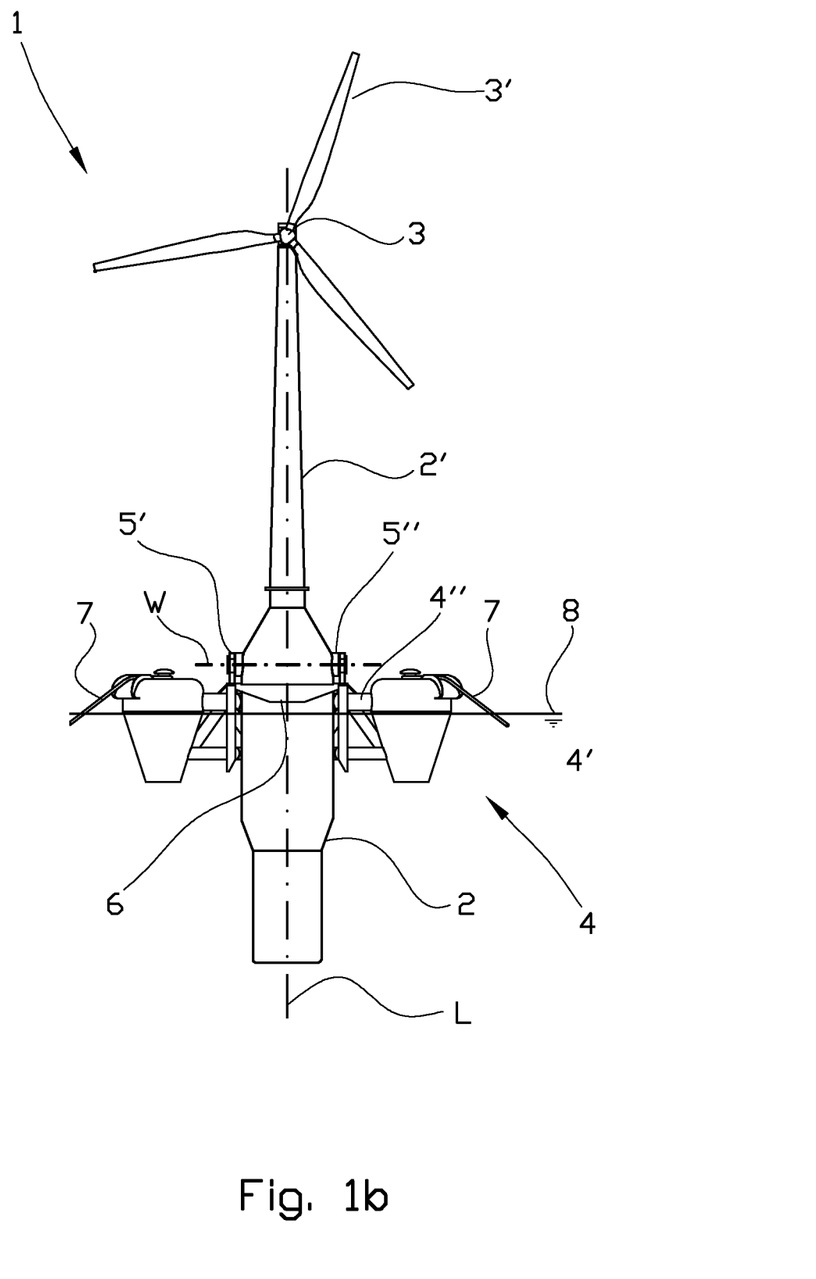
FIG. 1b illustrates the same as FIG. 1a, but where the wind turbine is seen from the front.
Figure 1C:
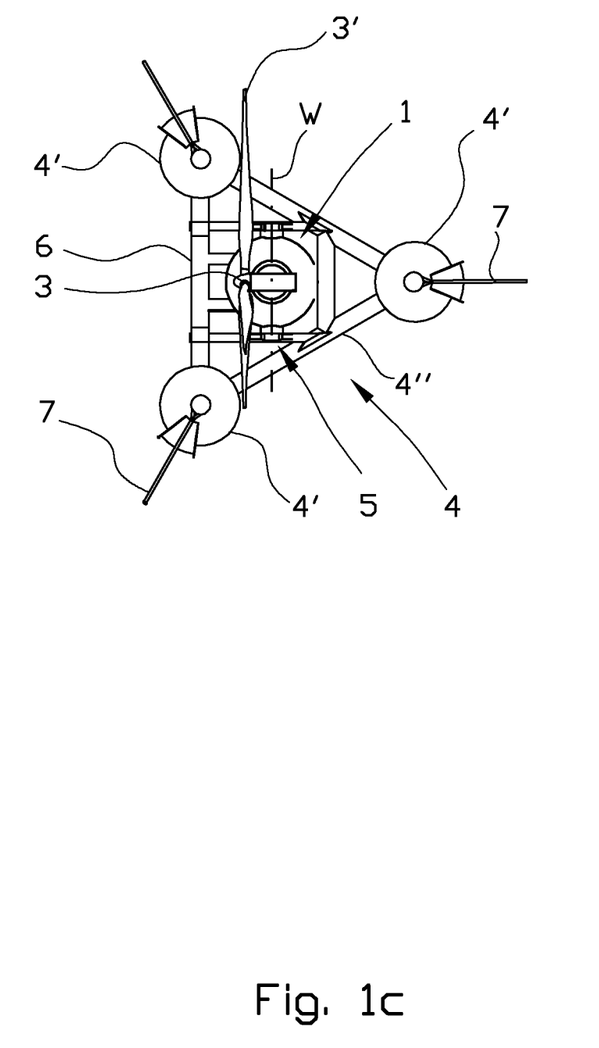
FIG. 1c illustrates the wind turbine of FIG. 1a seen from above.

In FIGS. 1a-1c the wind turbine 1 is illustrated in a vertical position. A vertical position or essentially vertical position will be the normal or production position of the wind turbine 1.

It should be understood that the turbine 3 of the wind turbine 1 in a per se known way is rotatably arranged on the supporting column 2' by means of a not illustrated bearing. The orientation of the rotor blades 3' relative to a wind direction can be controlled by means of a not illustrated motor controlled by signals from a direction sensor for wind. This is regarded as being well known to a person skilled in the art, and will not be described more closely in this document. The turbine 3 of the wind turbine 1 is arranged to be lockable against rotation relative to the supporting column 2', in such a way that the rotor blades 3' are oriented at a distance as large as possible from the water surface 8 when the wind turbine 1 is in a transport position.

In an alternative embodiment (not illustrated) the whole or a portion of the supporting column 2' may be arranged rotatable, in such a way that the turbine 3 can be securely connected with the supporting column 2'. This may e.g. be provided by arranging a rotary coupling of a per se known kind in the transition portion between the hull 2 of the supporting column 2', in the supporting column 2' itself, or e.g. by arranging a rotary coupling between the hull 2 and the buoyancy device 4. The rotary coupling is also in this alternative embodiment arranged to be lockable against rotation, in such a way that the rotor blades 3' are oriented at a distance as large as possible from the water surface 8 when the wind turbine 1 is in a transport position.

In FIGS. 1b and 1c there is a locking means 6 formed by a plate-shaped body attached to a portion of the hull 2, and which in a per se known way is arranged to be able to go into locking engagement with a portion of the frame construction 4". The locking engagement is selectively releasable. When the locking means 6 is in locking engagement with the frame construction 4", and thereby with the buoyancy device 4, the longitudinal axis L of the wind turbine 1 is prevented from rotation relative to the buoyancy device 4. The buoyancy device 4 will thereby contribute to stabilizing the wind turbine 1 when it is exposed to wind forces.

Figure 2A:
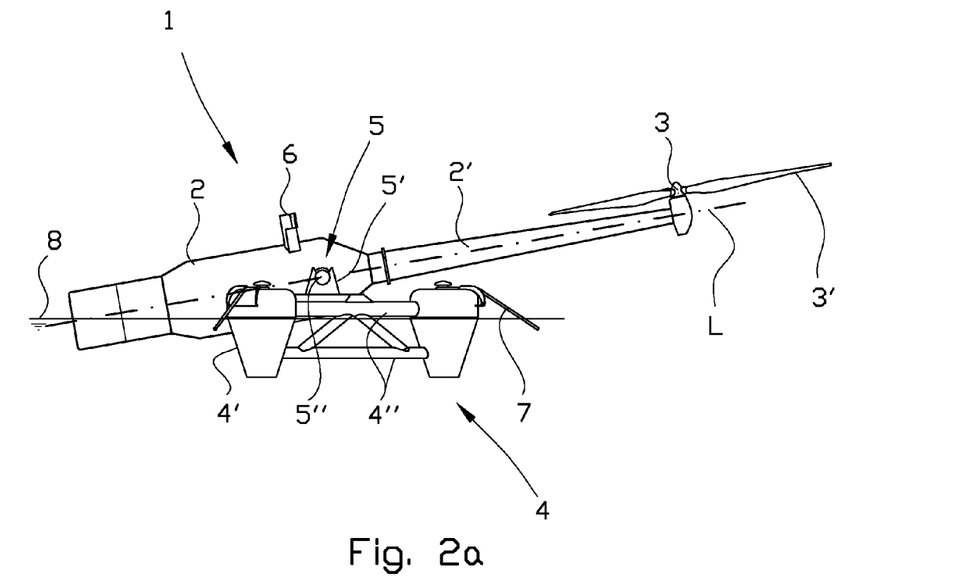
FIG. 2a illustrates the wind turbine of FIG. 1a, but after having been rotated to a near horizontal position.
Figure 2B:
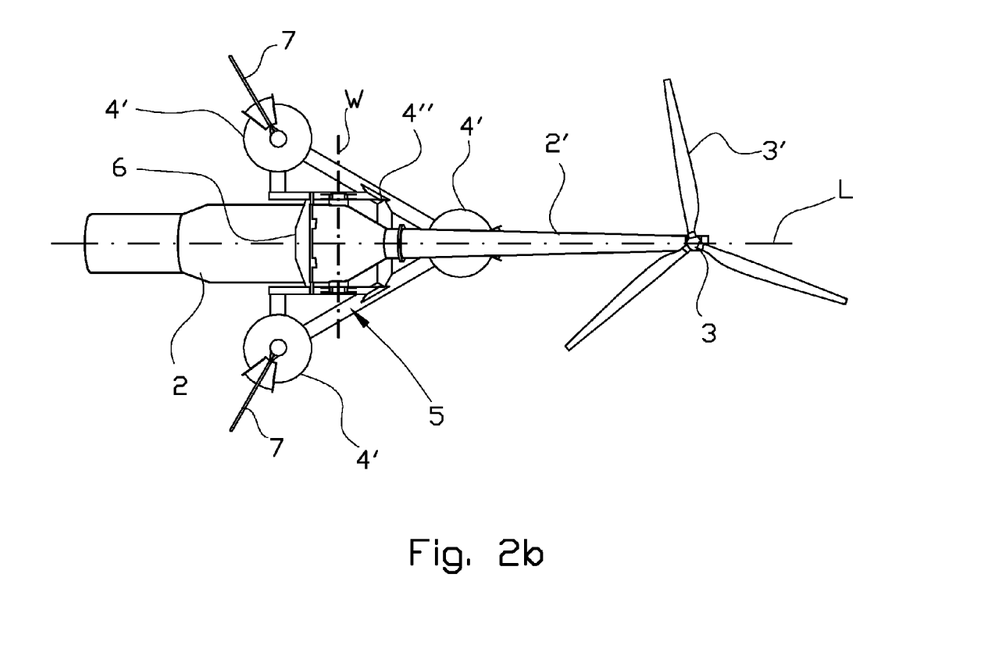
FIG. 2b illustrates the wind turbine of FIG. 2a seen in the direction towards the water surface.
Figure 3:
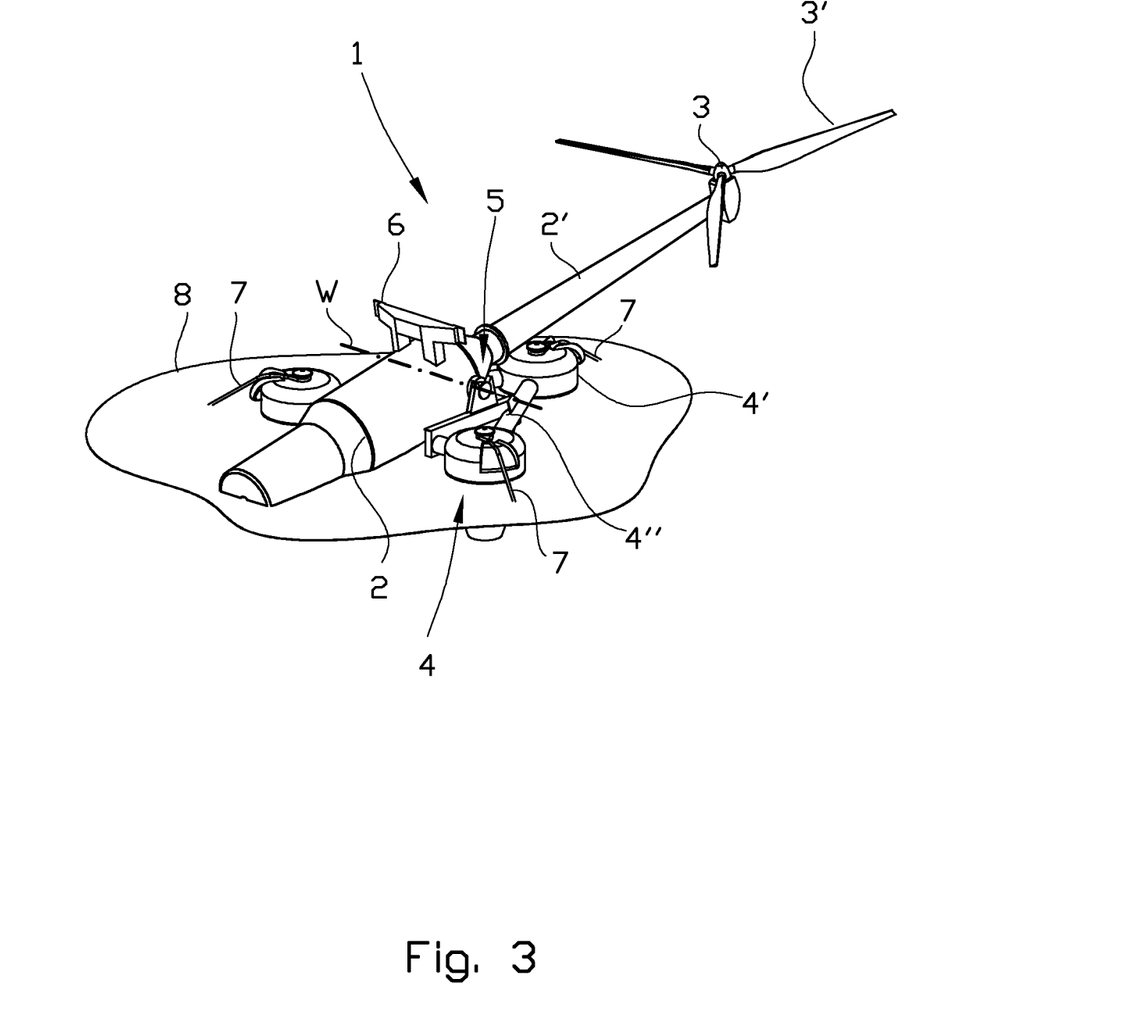
FIG. 3 illustrates a perspective elevational view of the wind turbine illustrated in FIGS. 2a and 2b.

In FIGS. 2a, 2b and 3 the wind turbine 1 is illustrated in a transport position where the longitudinal axis L of the wind turbine 1 is closer to a horizontal position than to a vertical position. The draft of the hull 2 and the height of the supporting column 2' is thereby considerably reduced relative to the position of the wind turbine 1 e.g. in FIG. 1a, which can be very advantageous with respect to flexibility related both to transport routes when moving the wind turbine 1, and to wharf sites which can be used for monitoring and maintenance work on the wind turbine 1.

In FIGS. 2a and 3 the wind turbine 1 is kept in balance about the coupling device 5 by means of an adjustable ballast means 9, 12 which will be described more closely when discussing FIG. 4. The locking means 6 is in the illustrated embodiment brought out of engagement with the buoyancy device 4. Thereby in all essentials vertical forces are transferred through the coupling device 5, whereby the buoyancy device 4 essentially maintains its normal position.

Figure 4:
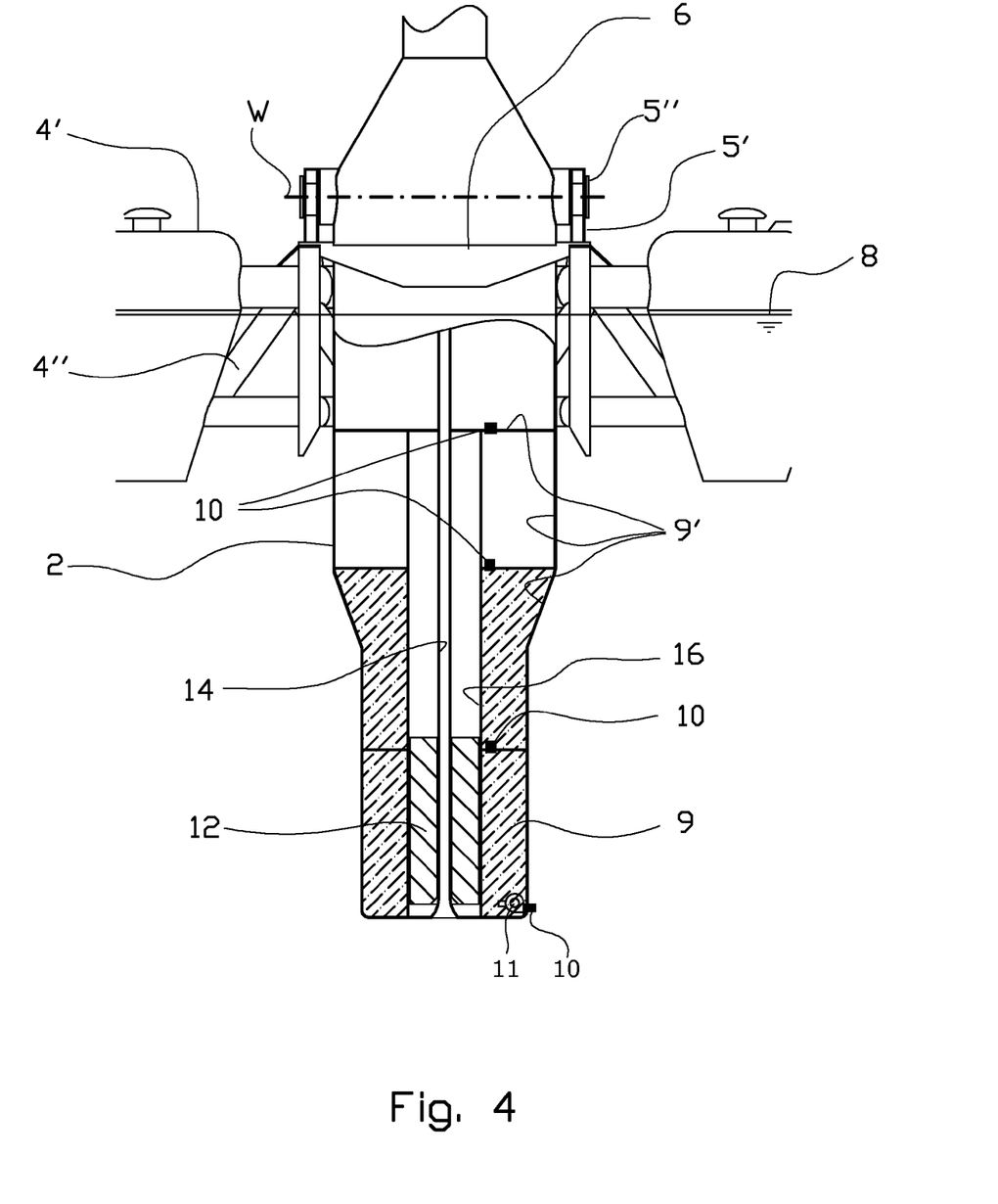
FIG. 4 illustrates in a larger scale an elevational view of a lower portion of the wind turbine and the base structure illustrated in FIG. 1b, where a portion of the wind turbine is illustrated in a cutaway view.

FIG. 4 illustrates in larger scale an elevational view of the hull 2 and a portion of the buoyancy device 4. A portion of the hull 2 is illustrated in a cutaway view. In FIG. 4 the wind turbine 1 has the position illustrated in FIG. 1b.

A weight 12 is movably arranged in a lower portion of the hull 2. The weight 12 encircles a cable routing bushing 14. The weight 12 and the cable routing bushing 14 is arranged in a weight routing bushing 16. Movement or shifting of the weight 12 may be provided by means of a lifting device (not illustrated) arranged between the hull 2 and the weight 12. The weight 12 will when shifting upwardly change the center of gravity of the hull 2 in such a way that the wind turbine 1 can be balanced about the rotary coupling 5 in any position between vertical position (where the weight 12 is located at the lowest of the hull 2, as illustrated in FIG. 4) and towards horizontal position, as illustrated e.g. in FIG. 2a (where the weight 12 is located closer to the rotary coupling 5 than illustrated in FIG. 4).

In addition to the weight 12, FIG. 4 also illustrates an adjustable ballast means comprising an adjustable fluid ballasting system for changing the mass and/or center of gravity of the hull 2, the wind turbine 1 can thereby be erected and laid down in a controlled way while the buoyancy device 4 essentially maintains its normal position.

The adjustable fluid ballasting system includes in the illustrated embodiment several closed chambers 9' (four are illustrated) arranged in the hull 2. The chambers 9' are fluidly connected to the surrounding water through an arrangement of valves 10 which allow water to flow through the chambers 9' and the surroundings in a per se known way. The valves 10 are controlled in a per se known way by means of a not illustrated control device. For emptying the chambers 9', there is an additional arrangement comprising a pump 11 as illustrated in FIG. 4, or in an alternative, not illustrated embodiment, a pressurized system where ballast water 9 is displaced by air or another gas which is pumped into e.g. one of the chambers 9' with a higher pressure than the surrounding water pressure, and which thereby forces water 9 in the chamber 9' through the valve 10 and out to the surrounding water.

As an alternative to what is explained above, the weight 12 may be securely anchored in the lower portion of the hull 2, as illustrated in FIG. 4. All adjustment of the ballast means 9, 12 in this alternative embodiment thereby must be provided by means of adjusting or redistribution of the fluid 9 in the chamber 9'.

Said advantages according to the embodiment of the invention will be particularly suited for wind turbines which shall be anchored at great ocean depths, and which according to the invention may be built and transported with the hull 2, the supporting column 2' and rotor blades 3' lying and thus with less draft and less height than known wind turbines, and thereby may be completed and maintained at shallower water depths, e.g. at a wharf, and be transported underneath constructions like e.g. a bridge without the use of special vessels.

While the invention has been described with a certain degree of particularity, many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A floating wind turbine (1) for electric power production, the wind turbine (1) comprises:
   a hull (2) attached to a supporting column (2') for a wind turbine (3) arranged to be rotated by wind force acting on rotor blades (3');
   the wind turbine (1) being connected to a buoyancy device (4) by means of a coupling device (5);
   the buoyancy device (4) being arranged to encircle at least a portion of the hull (2) and arranged to support at least a portion of a mass of the wind turbine (1);
   the coupling device (5) being a rotary coupling arranged such that the wind turbine (1) rotates an angle from an essential vertical position towards a horizontal position, or the opposite; and
   the hull (2) being provided with an adjustable ballast means (9, 12) arranged to balance the wind turbine (1) about the rotary coupling (5) in any position between said horizontal and vertical positions.

2. The wind turbine (1) of claim 1, wherein the ballast means comprises a weight (12) movably arranged along a longitudinal axis of the wind turbine (1).

3. The wind turbine (1) of claim 1, wherein the ballast means comprises at least one fluid (9) arranged to be brought into or out of at least one chamber (9') arranged in the hull (2).

4. The wind turbine (1) of claim 3, wherein the at least one fluid includes a liquid (9) and the at least one chamber (9') comprises at least two chambers (9'), and the amount of liquid (9) in each of the chambers (9') is adjustable.

5. The wind turbine (1) of claim 1, wherein the buoyancy device (4) comprises at least three spaced apart buoyancy bodies (4') which are securely connected to a frame construction (4"), the frame construction (4") supports the coupling device (5).

6. The wind turbine (1) of claim 1, wherein the wind turbine (1) is provided with a locking means (6) to fix the wind turbine (1) relative to the buoyancy device (4) at least in the essential vertical position.

7. A method for controlling a vertical extent of a floating wind turbine (1) for production of electric power, in connection with transport and maintenance, the wind turbine (1) comprises a hull (2) attached to a supporting column (2') for a wind turbine (3) arranged to be rotated by wind force acting on rotor blades (3'), the wind turbine (1) is connected with a buoyancy device (4) arranged at least partially encircling at least a portion the hull (2), and which is arranged to support at least a portion of the mass of the wind turbine (1), the method comprises the following steps:
   interconnecting the wind turbine (1) with the buoyancy device (4) by means of a rotary coupling (5) in such a way that the wind turbine (1) can be rotated an angle from an essentially vertical position towards a horizontal position, or the opposite;
   performing a rotary movement of the wind turbine (1) about the rotary coupling (5);
   balancing the wind turbine (1) about the rotary coupling (5) in any position between said vertical and horizontal positions by adjusting a ballast device (9, 12) arranged in the hull (2) of the wind turbine (1).

8. The method of claim 7, wherein the rotary movement is provided by controlling the adjustable ballast device (9, 12).

9. The method of claim 7, wherein the adjustable ballast device is provided by means of a weight (12) which is moved along a longitudinal axis (L) of the wind turbine (1).

10. The method of claim 7, wherein the ballast means is provided by means of at least one fluid (9) which is brought into or out of at least one chamber (9') arranged in the hull (2).

11. The method of claim 10, wherein the at least one fluid (9) includes a liquid and the at least one chamber (9') comprises at least two chambers (9'), and the amount of liquid in each of the chambers (9) is adjusted.

12. The method of claim 8, wherein the adjustable ballast device is provided by means of a weight (12) moved along a longitudinal axis (L) of the wind turbine (1).

* * * * *